United States Patent [19]

Tarumi et al.

[11] 4,158,795
[45] Jun. 19, 1979

[54] BRUSHLESS DC MOTORS

[75] Inventors: Kenkichi Tarumi; Junichi Kanamori, both of Tokyo, Japan

[73] Assignee: Sansui Electric Co., Ltd., Tokyo, Japan

[21] Appl. No.: 845,618

[22] Filed: Oct. 26, 1977

[30] Foreign Application Priority Data

Oct. 30, 1976 [JP] Japan .................. 51-130784

[51] Int. Cl.$^2$ .................................. H02K 29/00
[52] U.S. Cl. ................... 318/138; 318/254; 318/290
[58] Field of Search ............... 318/138, 254, 290, 289, 318/288, 685, 696

[56] References Cited

U.S. PATENT DOCUMENTS

| 3,518,517 | 6/1970 | Rainer .................. 318/290 |
| 3,946,292 | 3/1976 | Tanikushi ............... 318/138 |

Primary Examiner—Gene Z. Rubinson
Attorney, Agent, or Firm—Harris, Kern, Wallen & Tinsley

[57] ABSTRACT

A brushless DC motor capable of change of rotational direction is disclosed. The feed of a high-frequency voltage signal to switching elements is sequentially changed to orderly excite stator windings by the outputs from rotor angular position detectors so that the rotor is rotated in a desired direction. Another high-frequency voltage signal is applied to the switching elements at a time when opposite direction rotation is required, so that the high-frequency voltage signal applied to one of the switching elements in response to the outputs of the detectors is cancelled by the other high-frequency voltage signal. Therefore, the order of the excitation of stator windings is inverted and, thus, the rotor is rotated in the opposite direction.

The other high-frequency voltage signal has the same frequency as, a greater amplitude than, and a phase difference of 90°–270° from, the high-frequency voltage signal which is applied to one of the switching elements in response to the control of the detectors.

4 Claims, 17 Drawing Figures

OUTPUT VOLTAGE OF $OSC_2$

OUTPUT VOLTAGE OF $\phi_1$, $\phi_2$ OR $\phi_3$

RESULTANT VOLTAGE WAVE

FIG. 6b.

OUTPUT VOLTAGE OF $OSC_2$

OUTPUT VOLTAGE OF $\phi_1$, $\phi_2$ OR $\phi_3$

RESULTANT VOLTAGE WAVE

OUTPUT VOLTAGE OF $OSC_2$

OUTPUT VOLTAGE OF $\phi_1, \phi_2$ OR $\phi_3$

RESULTANT VOLTAGE WAVE

VOLTAGE ACROSS RESISTOR R

OUTPUT VOLTAGE OF $\phi_1$, $\phi_2$ OR $\phi_3$

RESULTANT VOLTAGE WAVE

BRUSHLESS DC MOTORS

BACKGROUND OF THE INVENTION

This invention relates to brushless DC motors and, in particular, to switching circuits of such motors to enable the control of reverse rotation.

A brushless DC motor has been known which comprises a permanent magnet rotor, a stator having a plurality of magnetic pole pieces on which windings are mounted, and a switching circuit for switching the feed of DC current to the windings in response to outputs of a plurality of detectors which are mounted in the stator at respective spaces between adjacent pole pieces.

As switching elements, transistors, micro-switches and other switching elements are used. They are connected between respective windings and a common DC power source, and are controlled by respective detectors to sequentially excite the windings in order of the rotational direction. Thus, the rotor is rotated in the direction desired. Magnetic, electrostatic or optical detection is employed for detecting the rotational angular position of the permanent magnet rotor.

The brushless DC motor is advantageously used as a motor in record players, tape recorders and so on, because of its long life time, excellent performances such as high S/N ratio and others and no-relation to the frequency of the power source. But it has a fault that a reverse rotation is not simply realized.

The reverse rotation is required in tape recorders and is used for a braking force in record players as well as tape recorders.

Accordingly, a brushless DC motor which is able to change the rotational direction with a simple construction is desirable.

SUMMARY OF THE INVENTION

An object of this invention is to provide a brushless DC motor which is able to change the rotational direction.

Another object of this invention is to realize the above object with a simple construction.

A still another object of this invention is to provide a brushless DC motor using a high-frequency voltage oscillator whose output is used for turning on switching elements controlling the excitation of the stator windings in response to the outputs from rotor angular position detectors, and which is capable of reverse rotation of the rotor by the provision of an additional high-frequency voltage generator and a switching element for controlling the generator depending on the rotational direction.

A further object is to provide a brushless DC motor using inductors as the rotor rotational angular position detectors which are fed a high-frequency voltage, which is able to change the rotational direction by the provision of an additional high-frequency voltage generator and a switching element for controlling the generator depending on the rotational direction.

According to this invention, a high-frequency voltage generator is additionally provided which is coupled with the switching elements through a common switching element. The output voltage signal of the additional voltage generator has the same frequency as, a greater amplitude than, and a phase difference of 90°–270° from, the voltage signal applied to the switching elements in response to the outputs of the rotor angular position detectors. Therefore, when the additional high-frequency voltage signal is applied to the switching elements, the rotor is rotated in the reverse direction.

A brushless DC motor of an aspect of this invention comprises a permanent magnet rotor, a stator having a plurality of magnetic pole pieces on which windings are wound, and a switching circuit for switching the feed of DC current to the windings.

A plurality of inductors are mounted in the stator at each space between two adjacent pole pieces and are fed a high-frequency voltage from a high-frequency oscillator. Each of the inductors develops a voltage signal at a time when it faces a predetermined magnetic pole of the permanent magnet rotor. The inductors are connected to respective switching elements which are connected between a common DC power source and respective stator windings, to turn on the switching elements by the outputs of the inductors.

A high-frequency voltage generator is connected in series with all of the inductors. The output voltage is phase-shifted by an angular phase between 90° and 180° from the output of each inductor and has an amplitude more than the output of each inductor. Therefore, the voltage levels applied to the switching elements are inverted in comparison with the outputs of the inductors when the output of the generator is applied to the inductors.

An additional switching element is connected in parallel with the output of the generator, to control the application of the output of the generator to the inductors according to control signals applied thereto.

When a signal is applied to the additional switching element to be closed, the output of the generator is short-circuited. Therefore, since the outputs of the inductors are directly applied to the switching elements, the rotor is rotated forwardly. On the other hand, when another signal is applied to the additional switching element, the output of the generator is applied to the inductors, so that the rotor is rotated in the reverse direction.

Transistors are preferably used as the switching element and the additional switching element.

A resistor means may be used connected in series with the inductors as the high frequency voltage generator. In this case, the additional switching element is connected in parallel with the resistor together with a capacitor which is connected in series with the additional switching element.

Further objects and features of this invention will be understood from following description in connection with preferred embodiments in reference to annexed drawings.

DETAILED DESCRIPTION OF PREFERRED EMBODIMENTS

Generally speaking, this invention attempts to enable the reverse rotation of a brushless DC motor wherein the feed of a high-frequency voltage to switching elements is controlled by outputs from rotor angular detectors to control the excitation of stator windings to rotate the rotor in a direction, by applying another high-frequency voltage to the switching elements.

Figure 1:
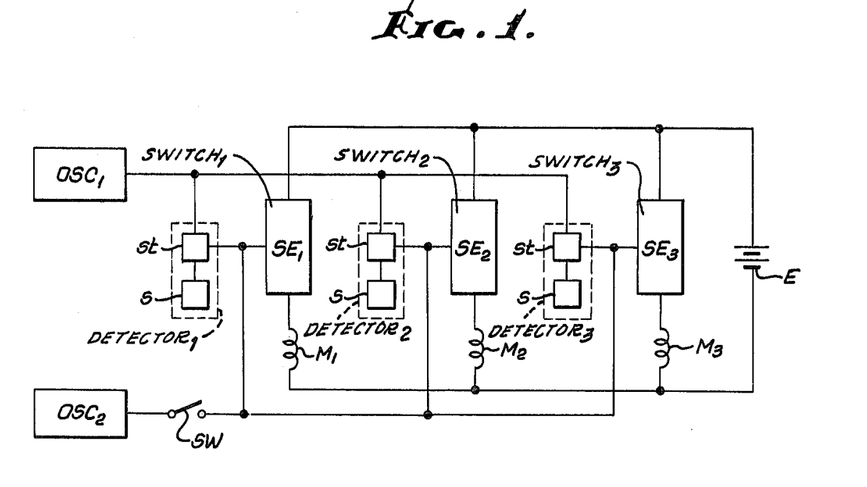
FIG. 1 shows a of block diagram of an embodiment of this invention.

Referring to FIG. 1, in which a block diagram of an embodiment is schematically shown, the embodiment is characterized by the provision of a voltage oscillator $OSC_2$ and a switch SW.

A plurality of stator windings (three windings $M_1-M_3$ are shown) are connected to a DC power source E through corresponding switching elements $SE_1-SE_3$. Each switching element is a transistor or other element having a critical operative voltage.

A high-frequency oscillator $OSC_1$ generates a voltage signal over the critical operative voltage with a high-frequency. The output of the oscillator $OSC_1$ is coupled with switching elements $SE_1-SE_3$ through rotor angular position detectors $DET_1-DET_3$.

Each rotor angular position detector may be an inductor which will be described hereinafter or a detector according to an optical method or an electrostatic method. For example, the detector of the optical method comprises a disk having hole rotating with the rotor, a sensor s comprising a light source and a photo diode, and a switching transistor st which is controlled by the output of the photo diode.

Now, assuming the detector $DET_1$ detects a predetermined rotor angular position, the high-frequency voltage from the oscillator $OSC_1$ is applied to the switching element $SE_1$. Thus, the switching element $SE_1$ is turned on to excite the stator winding $M_1$ so that the rotor rotates in a direction. Then the detector $DET_2$ operates to turn on the switching element $SE_2$. Therefore, the stator winding $M_2$ is excited to further rotate the rotor in the direction. Thereafter, the detector $DET_3$ detects the predetermined angular position to turn on the switching element $SE_3$. Accordingly the stator winding $M_3$ is excited, and the rotor is rotated in the direction.

Therefore, the rotation of the rotor is maintained in the initial direction.

Oscillator $OSC_2$ generates a high-frequency voltage having the same frequency as, a greater amplitude than, and a phase difference of 90°-270° from, the high-frequency voltage applied to each switching element $SE_1-SE_3$ from the oscillator $OSC_1$. The output of the oscillator $OSC_2$ is coupled with the switching elements $SE_1-SE_3$ through a common switch SW. The switch SW is preferably a switching transistor.

When the switch SW is closed to provide the high-frequency voltage to the switching elements $SE_1-SE_3$, the high-frequency voltage applied to one of switching elements $SE_1-SE_3$, for example $SE_1$, is cancelled by the high-frequency voltage from the oscillator $OSC_2$ at least partially, so that the switching element $SE_1$ is not turned on. But the other switching elements which are not applied the high-frequency voltage from the detectors $DET_2$ and $DET_3$, are turned on by the high-frequency voltage from the oscillator $OSC_2$. Therefore, the rotor is rotated in the opposite direction.

Figure 2:
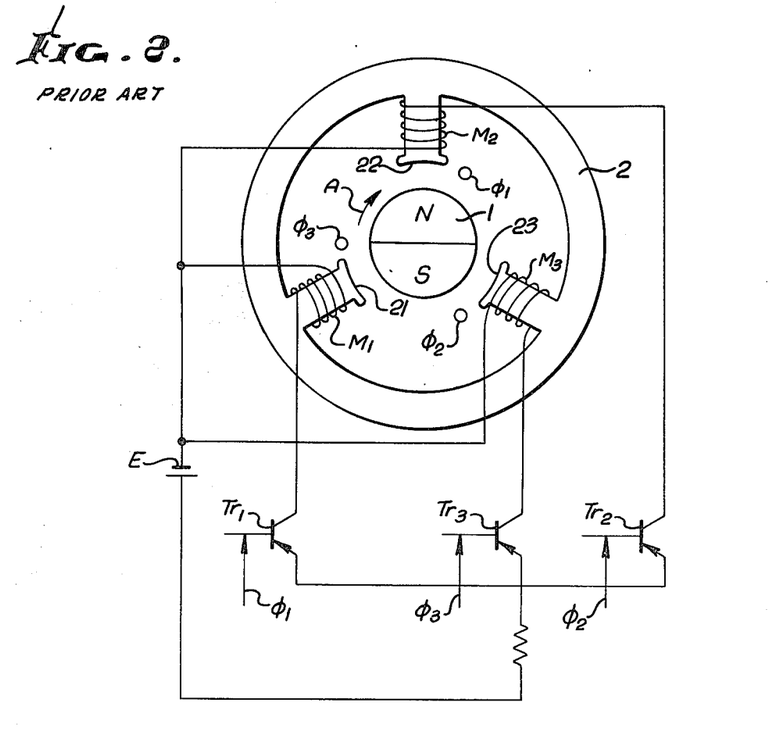
FIG. 2 schematically shows a known brushless DC motor.

Referring to FIG. 2, an example of a known brushless DC motor employing a magnetic detection for detecting the rotational angular position of the rotor is schematically shown, which comprises a permanent magnet rotor 1 and a stator 2 having three pole pieces 21-23 on which windings $M_1-M_3$ are wound, respectively.

Stator windings $M_1-M_3$ are connected to a DC power source, or a battery E through transistors $Tr_1-Tr_3$, respectively.

Transistors $Tr_1-Tr_3$ are for controlling the feed of the DC power to windings $M_1-M_3$ in response to outputs of inductors $\phi_1-\phi_3$ which detect the rotational angular position of the rotor 1. Microswitches and other switching elements may be used in place of the transistors, if they can be controlled by the output of the inductors.

Inductors $\phi_1-\phi_3$ are mounted on the stator 2 at spaces between two adjacent pole pieces as shown.

Figure 3:
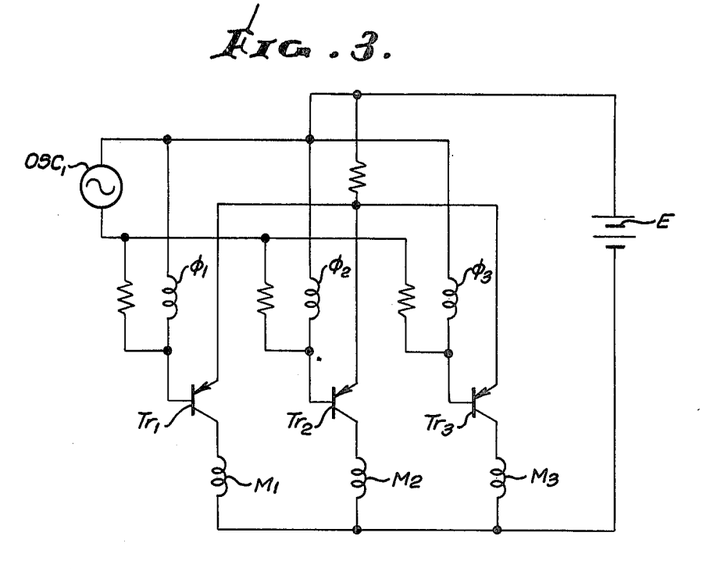
FIG. 3 shows a circuit diagram of a switching circuit used in the brushless DC motor in FIG. 2.

Referring to FIG. 3, inductors $\phi_1-\phi_3$ are connected to bases of transistors $Tr_1-Tr_3$, respectively, and are connected to a high-frequency oscillator $OSC_1$ in parallel with one another.

The high-frequency oscillator $OSC_1$ provides a high-frequency voltage of such as 50 KHz to each inductor.

The inductor comprises a saturatable ferromagnetic core or a ferromagnetic core of a low saturation magnetic flux density and a winding.

Assuming that each inductor is magnetically biassed so that the core is magnetically saturated at a time when it faces the center of a pole surface, for example the S-pole surface of the rotor 1, each inductor develops a self-induced output by the feed of the high-frequency output from the high-frequency oscillator when the inductor faces the N-pole of the rotor 1, and develops no output when the inductor faces the S-pole of the rotor 1.

The magnetic bias of the inductor is given by the application of DC current to the winding of the inductor or by the use of a bias magnet.

Each stator winding is so wound that the N-pole is developed at the end of the pole piece when the DC current flows therethrough from the battery E.

In operation, when inductor $\phi_1$ faces the N-pole of the permanent magnet rotor 1, it develops an output which turns on transistor $Tr_1$ as a base input voltage signal $\phi_1'$. Therefore, stator winding $M_1$ is excited by the DC power source E to form a N-pole at the end of the pole piece 21. The S-pole of the rotor 1 is attracted by the developed N-pole so that the rotor 1 rotates in the direction indicated by the arrow A.

Then, when inductor $\phi_2$ comes to face the N-pole of the rotor 1, transistor $Tr_2$ is turned on and stator winding $M_2$ is excited. Therefore, the rotor 1 is further rotated in the direction.

Similarly, when the inductor $\phi_3$ faces the N-pole of the rotor 1, the winding $M_3$ is excited through the transistor $Tr_3$, and the rotor 1 is rotated in the direction.

Figure 4:
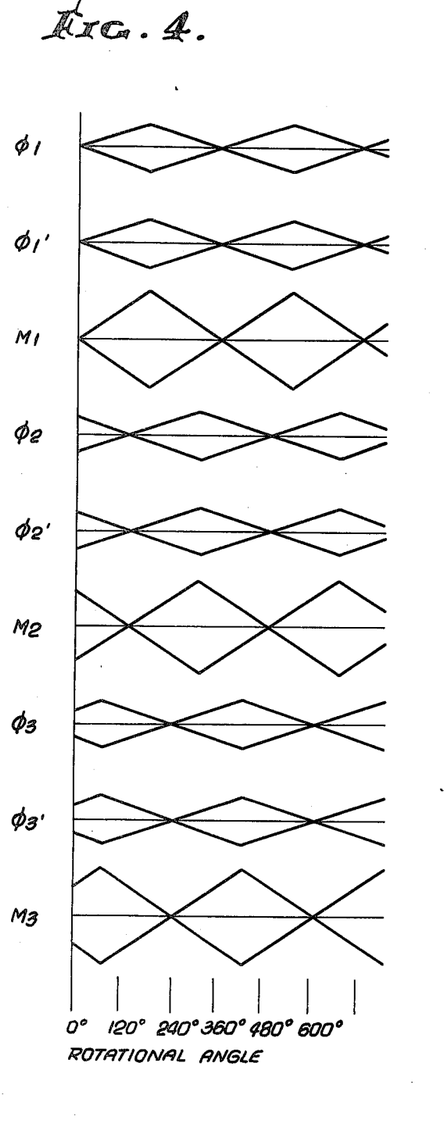
FIG. 4 shows the variations of inductances, base input voltage and the exciting currents depending on the rotation of the rotor, in the motor shown in FIGS. 2 and 3.

FIG. 4 shows the variations of the inductances $\phi_1-\phi_3$ of the inductors $\phi_1-\phi_3$, the input voltage signal $\phi_1'-\phi_3'$ to bases of transistors $Tr_1-Tr_3$, and the exciting currents $M_1-M_3$ of the windings $M_1-M_3$ depending on the rotation of the rotor 1. It is assumed that the rotational angle of the rotor 1 is zero at a time when the center of the S-pole surface of the permanent magnet rotor 1 faces the inductor $\phi_1$.

The shown waveforms are represented as envelope waveforms of high-frequency waveforms.

As is understood, windings $M_1$–$M_3$ are sequentially excited in order of the rotational direction so that the rotor is rotated in one direction.

In the above known brushless DC motor, it is not possible to change the rotational direction.

This invention aims to provide a brushless DC motor which is capable of reversible rotation, with a simple construction.

Figure 5:
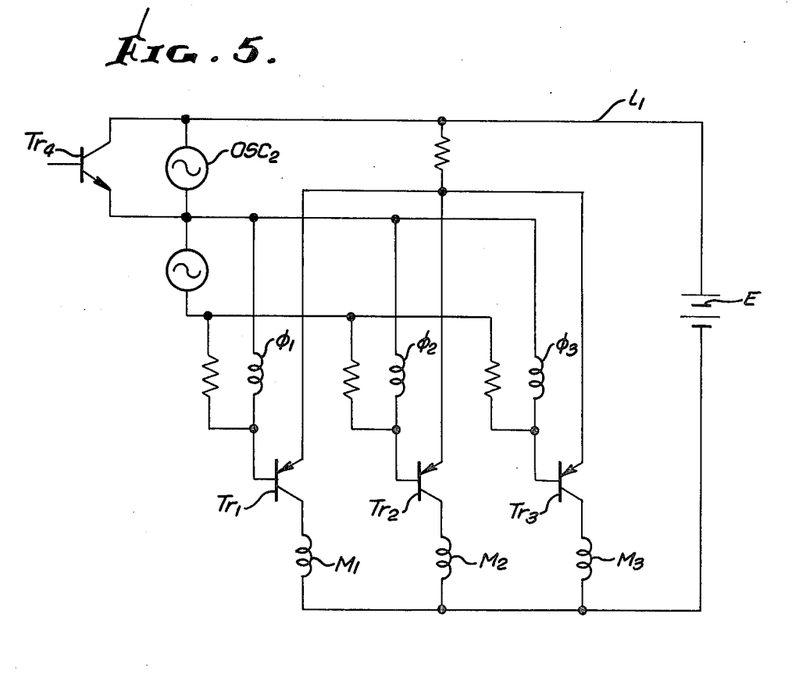
FIG. 5 shows a circuit diagram of an embodiment of this invention.

FIG. 5 shows a circuit diagram of an embodiment of this invention. The embodiment is similar as the brushless motor in FIGS. 1 and 3, except that an additional high-frequency voltage generator, or oscillator, $OSC_2$ and a switching transistor $Tr_4$ are provided. Similar parts are represented by the same reference characters as in FIGS. 2 and 3.

The generator $OSC_2$ is connected between a common connection point of the inductors $\phi_1$–$\phi_3$ and a DC power line $l_1$ which is coupled with emitters of transistors $Tr_1$–$Tr_3$. The switching transistor $Tr_4$ is connected in parallel with the generator $OSC_2$.

Therefore, when the switching transistor is turned on by the application of a signal to the base thereof, the output of the generator $OSC_2$ is short-circuited and the circuit in FIG. 5 is then equivalent to the circuit in FIG. 3. Therefore, when the switching transistor $Tr_4$ is in a conductive state, rotor 1 rotates in the direction indicated by the arrow A in FIG. 2, as has been already described referring to FIGS. 2 and 3.

On the other hand, when the transistor $Tr_4$ is in a non-conductive state, the output voltage of the generator $OSC_2$ is added to the output of each inductor. Therefore the base voltage potential of each switching transistor $Tr_1$–$Tr_3$ is changed, because it is a resultant voltage of the output of the inductor and the output of the generator.

The high-frequency voltage generator $OSC_2$ generates the voltage signal which is of a same frequency as the output of the oscillator $OSC_1$ but leads by an angular phase less than 180° or $\pi$ of the cycle.

Now, assuming that the output of the generator $OSC_2$ leads the output of the oscillator $OSC_1$ by 90°, the output of the generator $OSC_2$ leads the output of each inductor $\phi_1$–$\phi_3$ by 180°, because a voltage output is present across each inductor which is later by 90° than the output of the oscillator $OSC_1$.

Figure 6A:
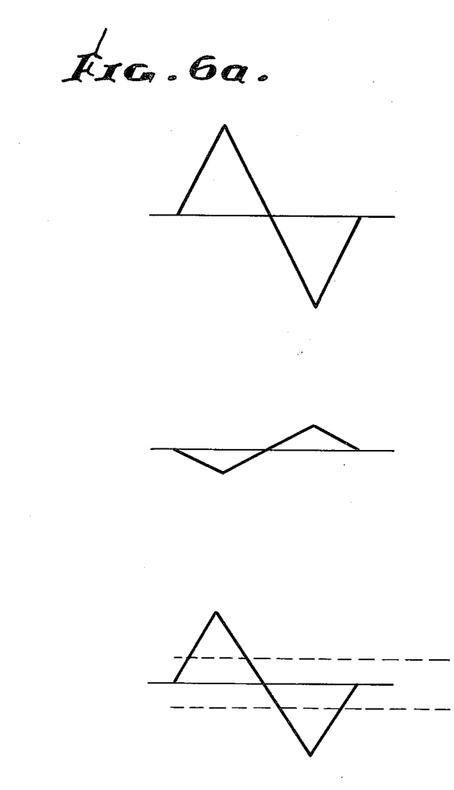
FIGS. 6(a) and 6(b) show wave forms for explaining a principle of the reverse rotation in the embodiment in FIG. 5.
Figure 6B:
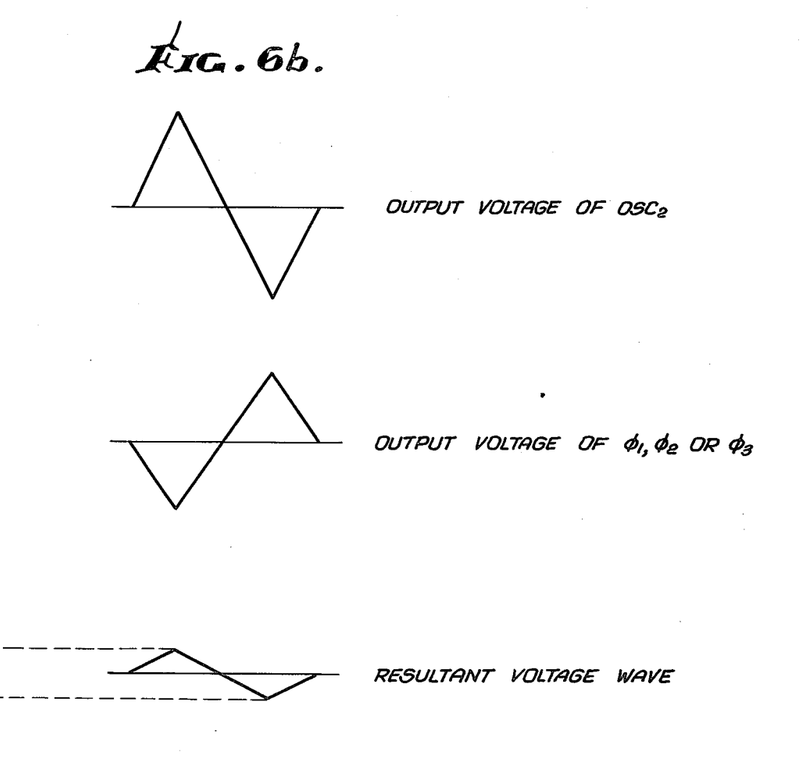

Therefore, when the output amplitude of the inductor is smaller than the output amplitude of the generator $OSC_2$, the resultant voltage wave is in a reverse phase to the output of the detector. And the greater the amplitude of the inductor is, the smaller the amplitude of the resultant voltage wave is. This is schematically illustrated in FIGS. 6(a) and 6(b).

Accordingly, if the N-pole of the rotor 1 faces the inductor $\phi_1$, the amplitude of the voltage signal $\phi_1'$ applied to the base of the transistor $Tr_1$ is small and, on the contrary, those of the voltage signals $\phi_2'$ and $\phi_3'$ are great. Therefore, is not excited the stator winding $M_1$ but the other stator windings $M_2$ and $M_3$ are excited, so that the rotor 1 is rotated in the opposite direction as composed with the conductive state of the switching transistor $Tr_4$.

Then, the inductor $\phi_3$ faces the N-pole of the rotor 1 and the stator windings $M_1$ and $M_2$ are excited so that the rotor 1 further rotates in the opposite direction. And when the inductor $\phi_2$ faces the N-pole of the rotor 1 the stator windings $M_1$ and $M_3$ are excited so that the rotor 1 is further rotated in the opposite direction. Thus, the rotor can be rotated in the opposite direction merely by turning off the switching transistor $Tr_4$.

Figure 7:
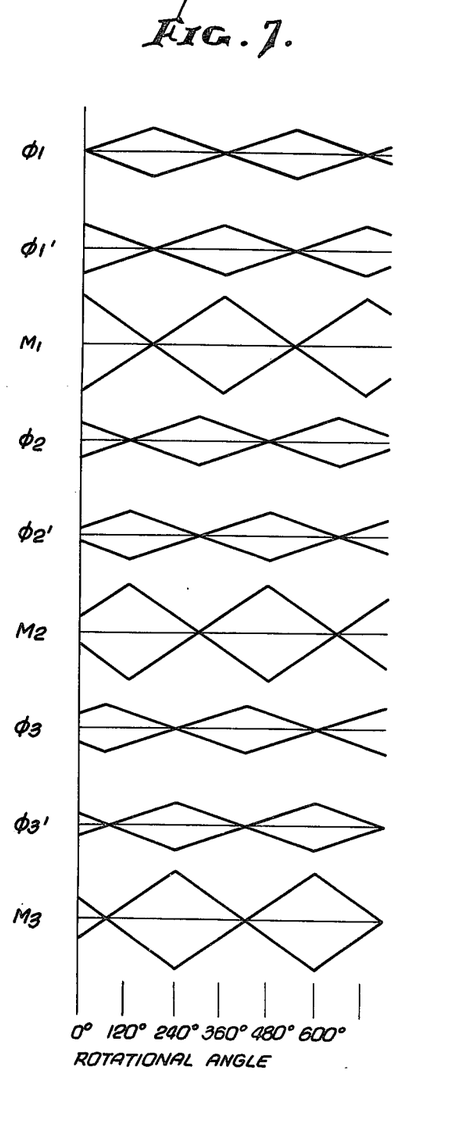
FIG. 7 shows various voltage waveforms during the reverse rotation in the embodiment in FIG. 5, which is similar as FIG. 4, FIGS. 8(a) and 8(b), 9(a) and 9(b), and 10(a) and 10(b) show wave forms for explaining the requirement to the output of the voltage generator $OSC_2$ in FIG. 5.

FIG. 7 schematically shows relations between the inductances $\phi_1$–$\phi_3$ of the inductors, the voltage signals $\phi_1'$–$\phi_3'$ to bases of transistors $Tr_1$–$Tr_3$, and exciting currents of windings $M_1$–$M_3$ and the rotational angle of the rotor in the case of the reverse rotation of the rotor.

If the phase difference between the output of the generator $OSC_2$ and the output of the inductor is more than 90° but less than 270°, and if the amplitude of the output of the generator $OSC_2$ is greater than the output of the inductor, the resultant voltage signal of the output of the generator $OSC_2$ and one of the inductors $\phi_1$–$\phi_3$ having the greater amplitude of inductors $\phi_1$–$\phi_3$ is smallest in the amplitude.

Figure 8A:
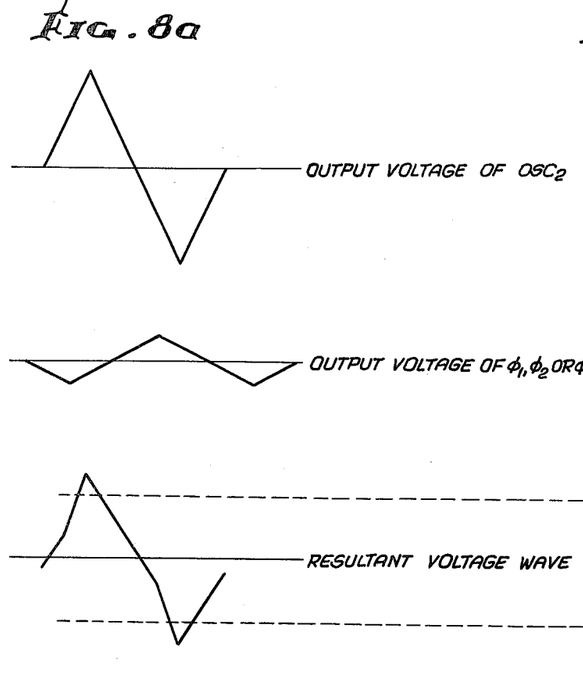
Figure 8B:
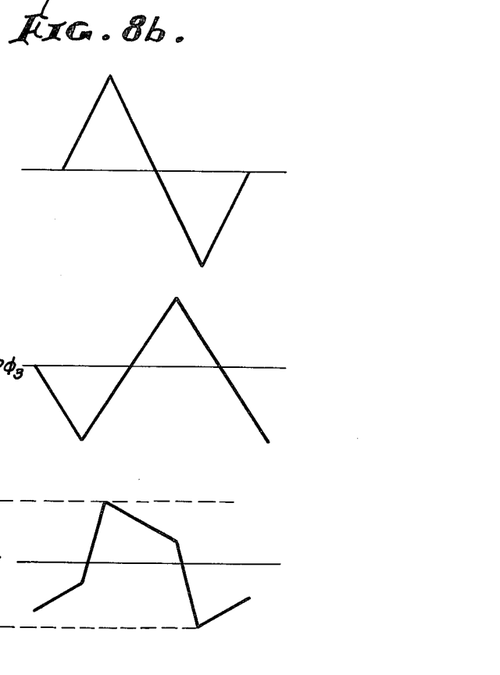
Figure 9A:
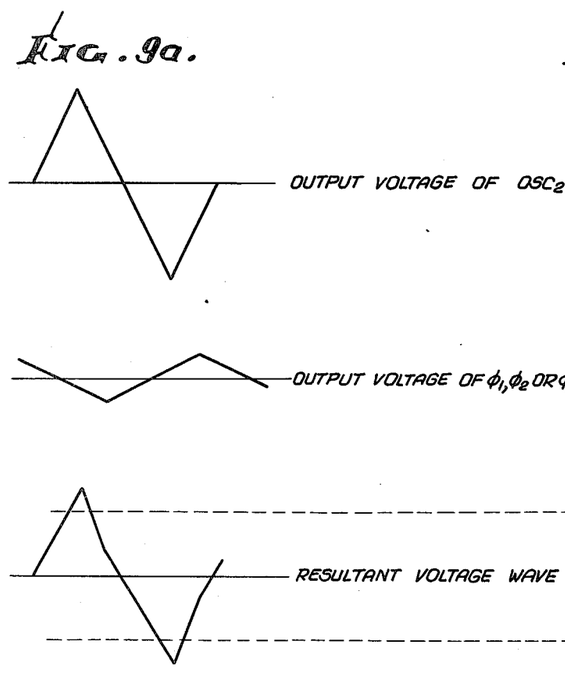
Figure 9B:
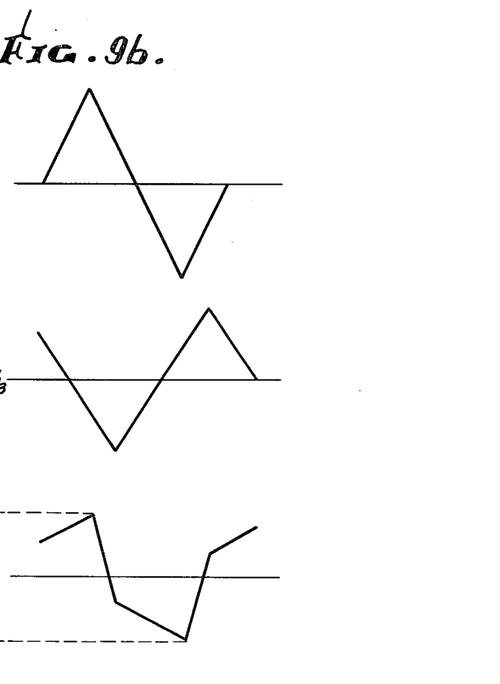

This is exemplified in FIGS. 6(a) and 6(b) which were already described, FIGS. 8(a) and 8(b) and FIGS. 9(a) and 9(b). FIGS. 8(a) and 8(b) illustrate the case when the output of the generator $OSC_2$ leads the output of the inductor by 145°, and FIGS. 9(a) and 9(b) show the case when the output of the inductor leads the output of the generator $OSC_2$ by 145°, or when the output of the generator $OSC_2$ leads the output of the inductor by 215°.

Therefore, the generator $OSC_2$ should be designed to provide the high-frequency voltage signal which leads the output of the oscillator $OSC_1$ by an angle between 0°–180°.

Figure 10A:
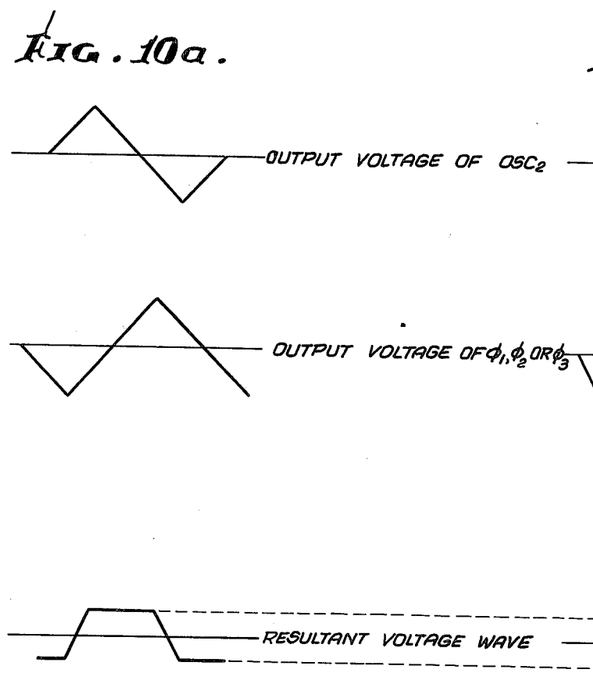
Figure 10B:
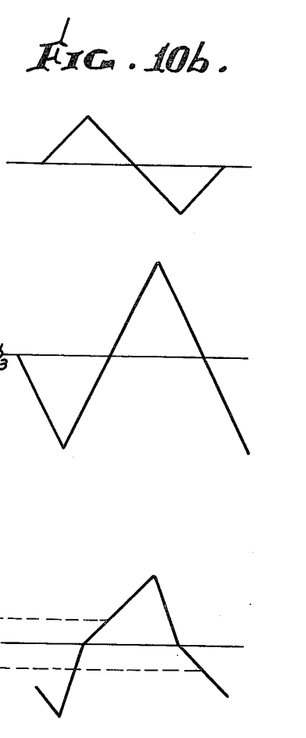

FIG. 10 schematically shows the case when the amplitude of the output of the inductor is greater than that of the output of the generator $OSC_2$. As will be noted from FIG. 10, the control of transistors $Tr_1$–$Tr_3$ by the inductors is not changed even if the generator $OSC_2$ is employed.

Figure 11:
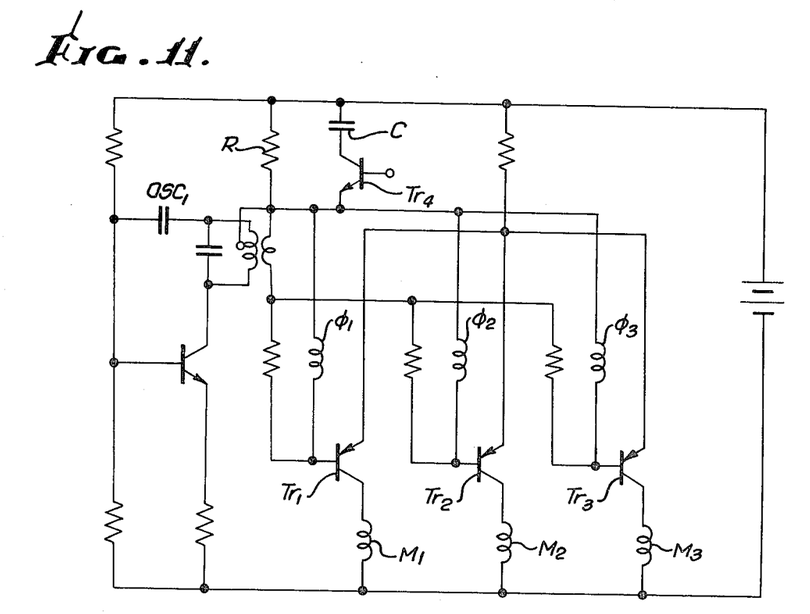
FIG. 11 shows a circuit diagram of another embodiment of this invention.

FIG. 11 shows another embodiment which is similar to the embodiment in FIG. 5 except that the generator $OSC_2$ is formed of a resistor R and that a capacitor C is connected in series with the switching transistor $Tr_4$. Similar parts are represented by same reference characters as in FIG. 5. In the figure, a circuit diagram of the oscillator $OSC_1$ is shown. When the transistor $Tr_4$ is in the conductive state, the high-frequency current is by-passed through the capacitor and the transistor $Tr_4$. Therefore, no high-frequency voltage is present across the resistor. Accordingly, the rotor is rotated in a direction as described referring to FIGS. 2–4.

Figure 12A:
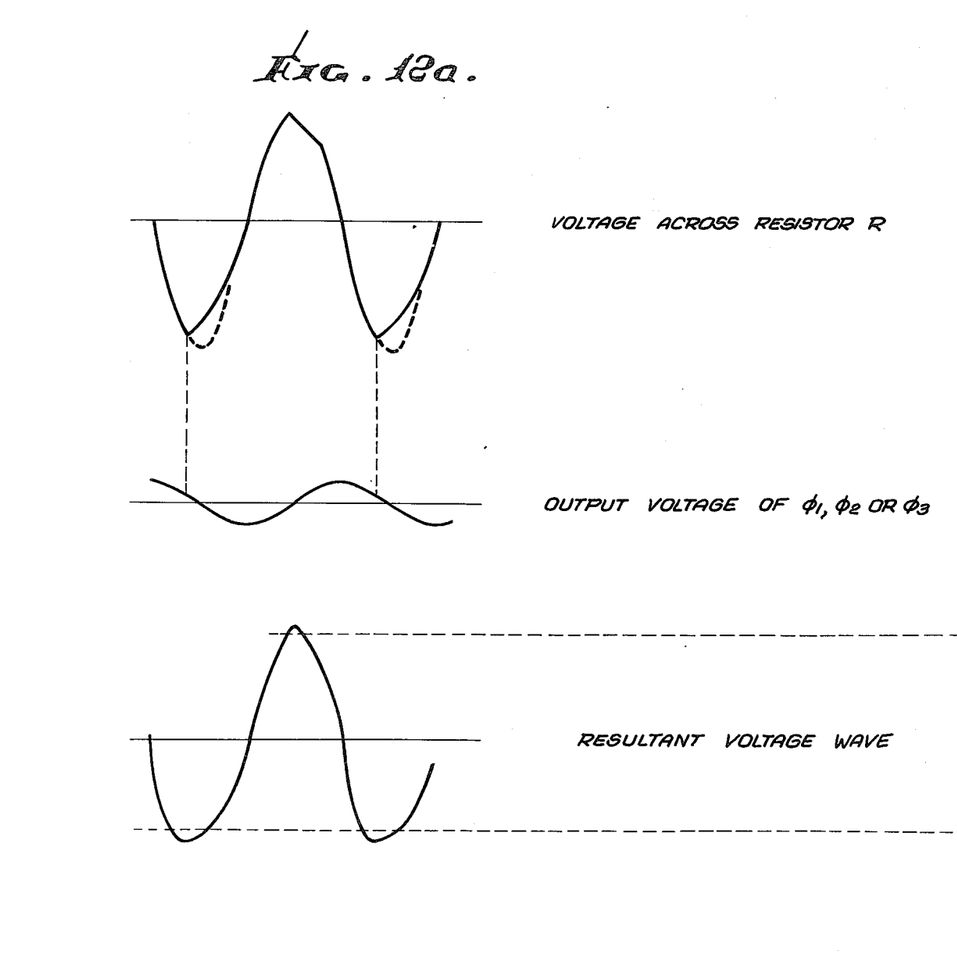
FIGS. 12(a) and 12(b) show waveforms for explaining the reverse rotation in the embodiment in FIG. 11.
Figure 12B:
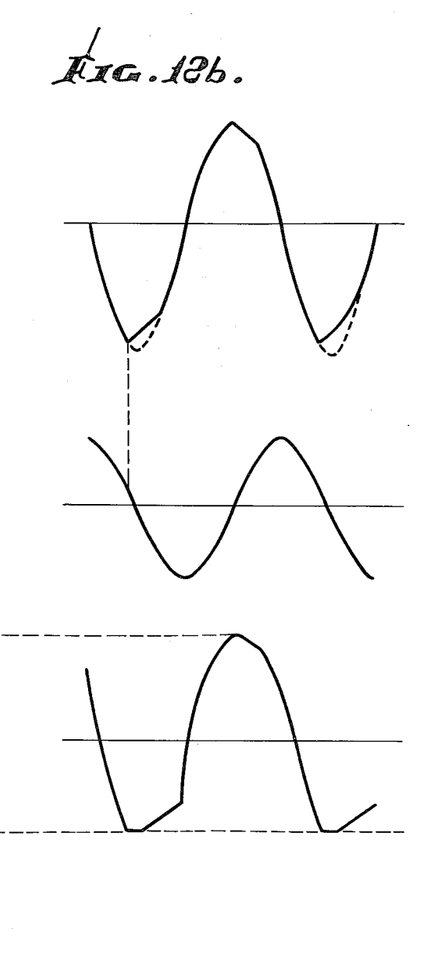

When the transistor $Tr_4$ is in the non-conductive state, the high-frequency voltage is present across the resistor R. The the output of each inductor is delayed by 90° in comparison with the output voltage of the oscillator $OSC_1$. Thus, the phase difference between the voltage across the resistor R and the output voltage of each inductor is 90° or more, taking into account that the voltage waveform across the resistor R is practically subjected to distortion, as shown in FIGS. 12(a) and 12(b).

Therefore, the amplitude of the voltage applied to a transistor corresponding to an inductor, for example $\phi_1$, which faces the N-pole of the permanent magnet rotor is smaller than those of the voltages applied to the other transistors. Therefore, the rotor rotates in the opposite direction, similarly as described in connection with the embodiment in FIG. 5.

In the embodiment of FIG. 11, the value R of the resistor R should be greater than the impedance $\omega L$ of each inductor $\phi_1$–$\phi_3$ (or $R > \omega L$), so that the voltage across the resistor R is greater than the output voltage of each inductor.

This invention has been described in detail in connection with preferred embodiments, but they are for exemplification. It will be noted to those skilled in the art that this invention is not restricted to those embodiments but various other designations and modifications are possible within the scope of this invention.

What is claimed is:

1. In a brushless DC motor including a stator having a plurality of magnetic pole pieces and windings thereon, a permanent magnet rotor, and a switching circuit for controlling the feed of DC current to respective windings and having a plurality of transistors which are connected in series with said windings, respectively, a plurality of inductors for detecting an angular position of said rotor and disposed in spaces between adjacent pole pieces along the rotor surface, respectively, each of said inductors being connected to a base of a corresponding one of said transistors, and a first high-frequency oscillator for providing a high-frequency signal to said plurality of inductors, each one of said plurality of inductors developing a signal to turn on the corresponding transistor at a time when said inductor faces a predetermined pole of said permanent magnet rotor, an improvement comprising a means for providing a voltage signal with the same frequency as, and a greater amplitude than, the signals from said inductors, said voltage signal providing means being connected in series with all of said inductors, and means for short-circuiting the output of said voltage signal providing means at a time when the motor is to be forwardly driven.

2. The improvement as claimed in claim 1, wherein said voltage signal providing means is a second voltage oscillator providing a voltage signal which leads the output signal of said first high-frequency oscillator by an angular phase less than 180° or $\pi$ of the cycle.

3. The improvement as claimed in claim 1, wherein said voltage signal providing means is a resistor means connected in series with all of said inductors and between a common connection point of said inductors and a power line which is coupled with emitters of said transistors, and said short-circuiting means is a series circuit of a capacitor and a switcing transistor which series circuit is connected in parallel with said resistor means, said switching transistor being turned on at a time when the motor is to be forwardly driven, and the resistance of said resistor means being greater than the impedance of each inductor.

4. In a brushless DC motor including a stator having a plurality of magnetic pole pieces and windings thereon, a permanent magnet rotor, and a switching circuit for controlling the feed of DC current to respective windings and having a plurality of switching elements having a critical operation voltage and connected in series with said windings, a first high-frequency oscillator for providing a high-frequency voltage signal having a voltage amplitude greater than the critical voltage, a plurality of detector means each of which is for detecting an angular position of said rotor and for applying the high-frequency voltage from said high-frequency oscillator to a corresponding one of said switching elements at a time when detecting, an improvement comprising a second high-frequency voltage oscillator for generating a voltage signal having the same frequency as, a greater amplitude than, and a phase differential of 90°–270° from, the voltage signal from said first high-frequency oscillator, and means for permitting application of the output from said second high-frequency voltage oscillator to all of said switching elements at a time when a signal is applied thereto, whereby the rotational direction is reversed.

* * * * *